Dec. 23, 1952     P. R. POWELL     2,622,821
CLUTCH FOR REELS
Filed July 7, 1949     4 Sheets-Sheet 1
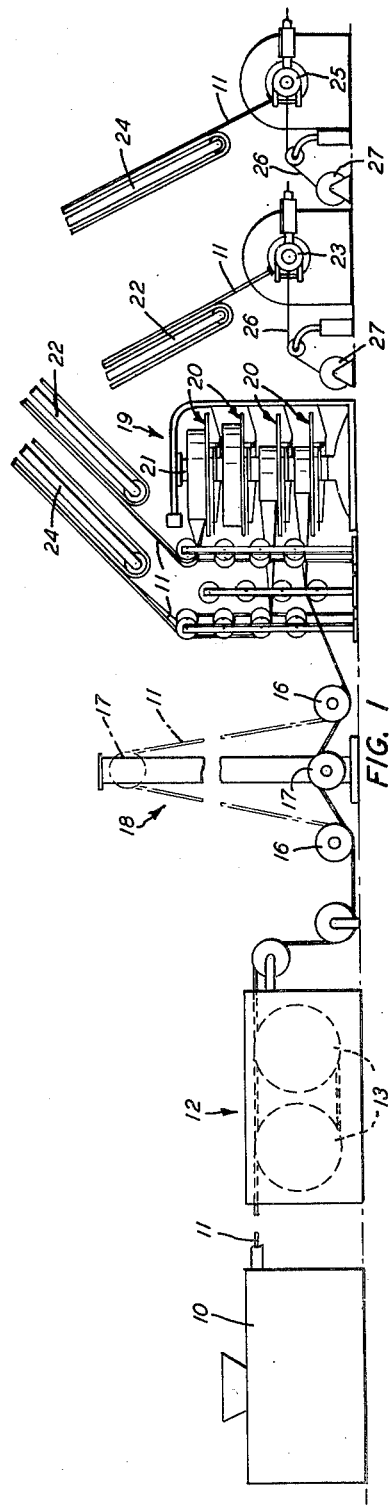
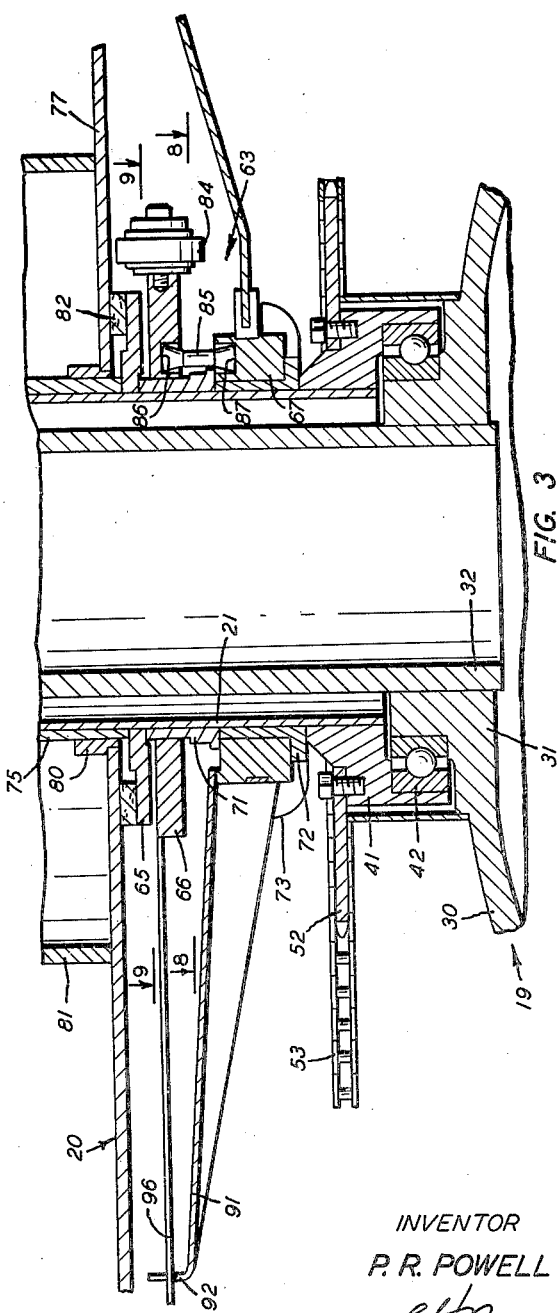
INVENTOR
P. R. POWELL
BY *[signature]*
ATTORNEY Dec. 23, 1952  P. R. POWELL  2,622,821
CLUTCH FOR REELS
Filed July 7, 1949  4 Sheets-Sheet 2

INVENTOR
P. R. POWELL
BY
ATTORNEY

Dec. 23, 1952 P. R. POWELL 2,622,821
CLUTCH FOR REELS
Filed July 7, 1949 4 Sheets-Sheet 3

INVENTOR
P. R. POWELL
BY
ATTORNEY

Dec. 23, 1952 P. R. POWELL 2,622,821
CLUTCH FOR REELS
Filed July 7, 1949 4 Sheets-Sheet 4
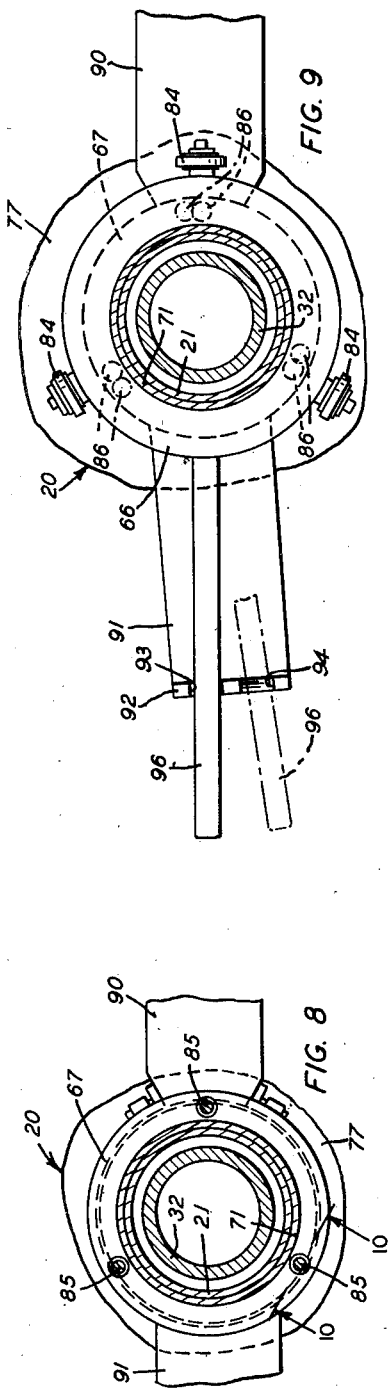
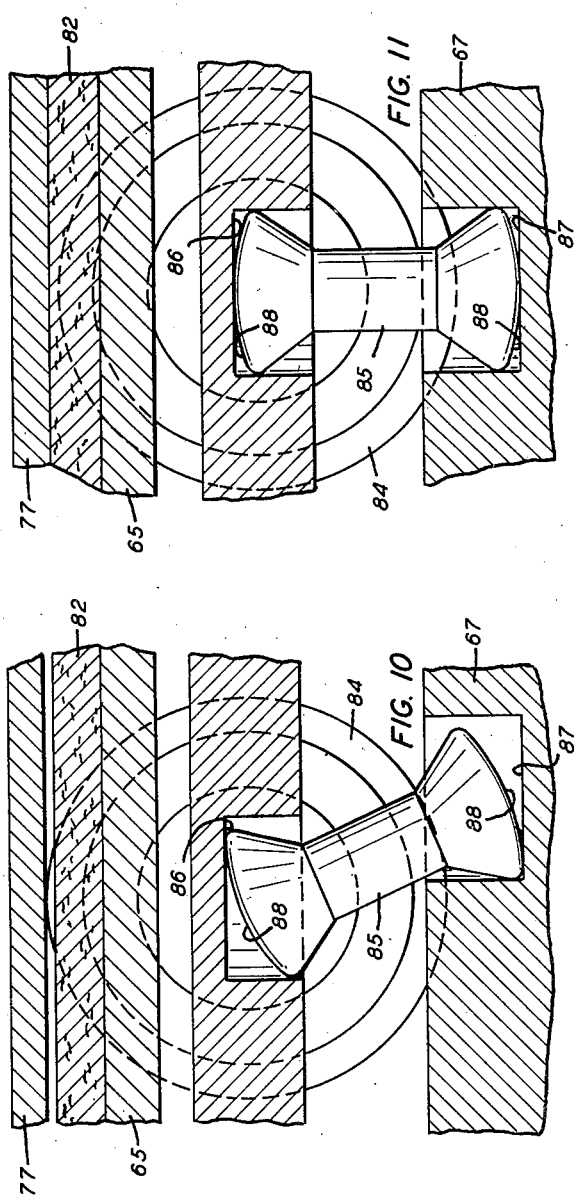
INVENTOR.
P. R. POWELL
BY
ATTORNEY Patented Dec. 23, 1952

2,622,821

UNITED STATES PATENT OFFICE 2,622,821

CLUTCH FOR REELS

Paul R. Powell, Baltimore, Md., assignor to Western Electric Company, Incorporated, New York, N. Y., a corporation of New York Application July 7, 1949, Serial No. 103,435

2 Claims. (Cl. 242—75)

This invention relates to clutches, and more particularly to clutches in which the driving member exerts a driving force on the driven member corresponding to the weight of the driven member.

In the manufacture of electrical conductors, a previously mixed, extrudable material is introduced into extruding apparatus designed to extrude the material in the form of an insulating covering or jacket on a continuously advancing filamentary conductor. To manufacture electrical conductors in large quantities economically, the extrudable material is conveyed to a plurality of such extruding apparatus in the form of a strip. A strip takeup and storage device is provided between the strip-forming means and the extruders, which is provided with a plurality of horizontally supported strip storage decks in order to maintain an adequate supply of the strip material for the extruders.

Since the strip is supplied from a single supply source, the strip takeup and storage device must be arranged to take up the strip material on one or more of the decks while the strip material is being withdrawn from one of the full decks. Such a strip-handling apparatus requires a clutch mechanism for each deck thereof, which is designed to selectively engage or disengage the deck from the driving member of the strip-handling apparatus.

An object of the invention is to provide new and improved clutches.

Another object of the invention is to provide new and improved clutches in which the driving member exerts a driving force on the driven member corresponding to the weight of the driven member.

One type of clutch which embodies certain features of the invention, comprises a constantly rotating driving member, a freely rotatable driven member positioned adjacent to the driving member, an actuator positioned adjacent to the driving member and having means for engaging the driven member, and means for selectively moving the actuator longitudinally of its axis to cause the driven member to be engaged by or disengaged from the driving member.

A clear understanding of the invention will be had from the following detailed description of a specific embodiment thereof, when read in conjunction with the appended drawings, in which:

Fig. 1 is a schematic diagram of a strip-handling system including strip-handling apparatus embodying certain features of the present invention;

Fig. 3 is an enlarged, fragmentary, sectional view of a portion of the strip-handling apparatus shown in Fig. 2;

Fig. 8 is a horizontal section taken along line 8—8 of Fig. 3;

Fig. 9 is a horizontal section taken along line 9—9 of Fig. 3;

Fig. 10 is an enlarged, vertical section taken along line 10—10 of Fig. 8, and

Fig. 11 is a view similar to Fig. 10 but showing some elements of the apparatus in another position.

Figure 2:
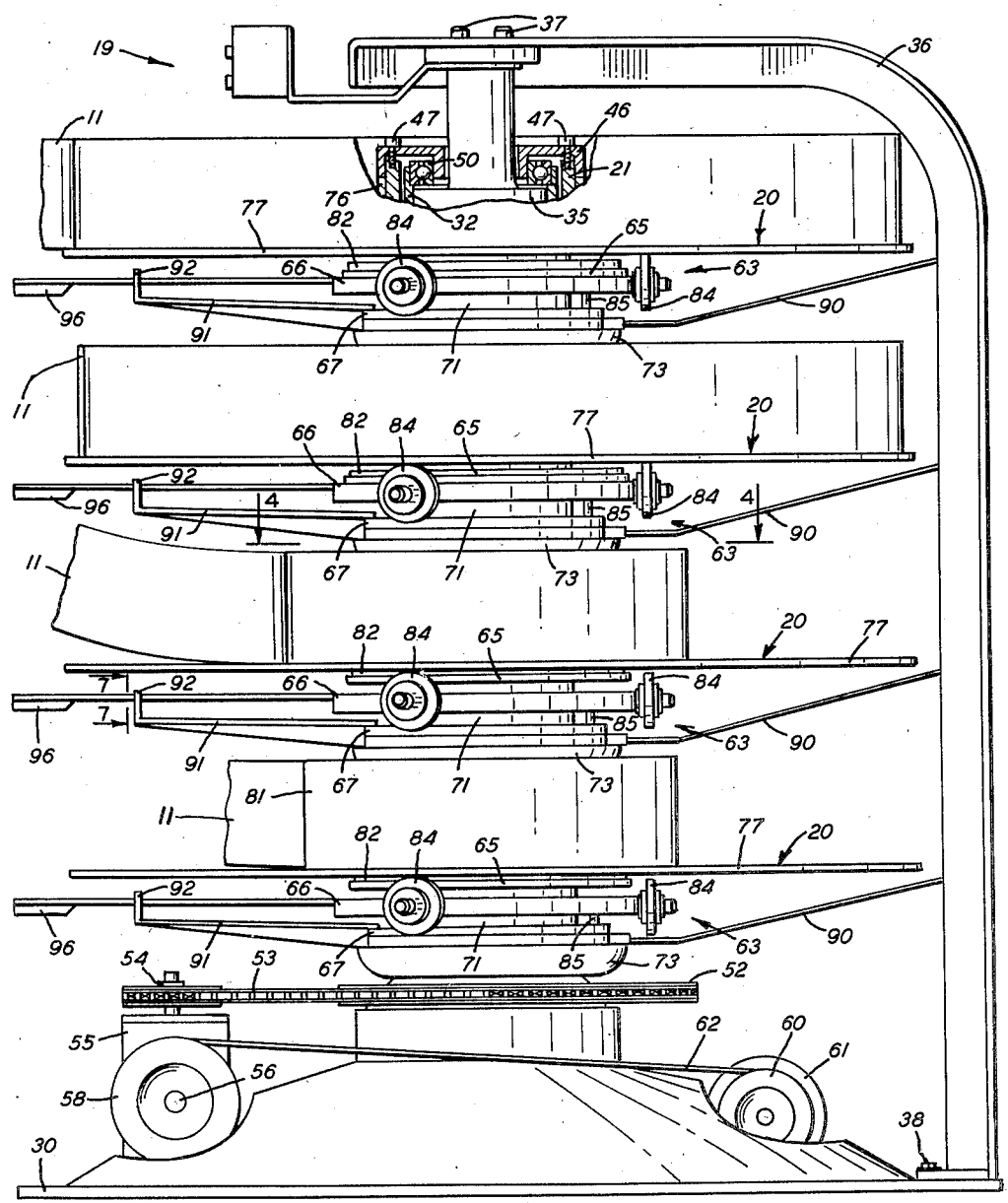
Fig. 2 is an enlarged elevation of a portion of the apparatus shown in Fig. 1.
Figure 7:
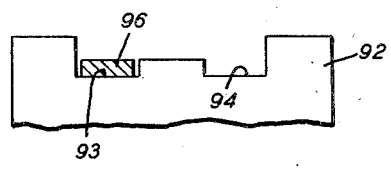
Fig. 7 is a vertical section taken along line 7—7 of Fig. 2.

Referring now to Fig. 1 of the drawings, there is shown a schematic diagram of a strip-handling system which may be used for handling strip material suitable for insulating electrical conductors. The strip material hereinafter referred to may be formed from a neoprene compound, a rubber compound, or a synthetic, rubber-like compound such as a Buna-S compound which may be vulcanized, or may be made of any one of various thermoplastic materials, such as polyvinyl compounds or polyethylene, which may be extruded as an insulating cover on a continuously advancing filamentary core such as one or more copper wires.

The numeral 10 designates a strip extruder designed to receive successive batches of mixed compounds in a hot, plastic state and extrude them therefrom in the form of a continuous compound strip 11, which passes directly into a cooler 12. The compound strip travels a tortuous path around drums 13—13 provided in the cooler and is subjected to a plurality of sprays of cold water to reduce the temperature of the strip 11. The compound strip leaves the cooler 12 and passes under the pulleys 16—16 and over a pulley 17 forming part of a temporary strip-storing apparatus indicated generally at 18. The strip passes from the storage apparatus 18 to an intermediate takeup and storage apparatus 19 where the compound strip 11 is taken up on the plurality of takeup reels 20—20 mounted independently on a common shaft 21.

The strip 11 stored on the reels 20—20 is withdrawn therefrom by a conveyor 22, which carries the compound strip to an extruder 23, and by a second conveyor 24, which carries the strip to a second extruder 25. Each of the extruders 23 and 25 is designed to work the compound strip into a plastic state and then extrude it in the form of an insulating covering or jacket on a filamentary core 26, which is withdrawn from a supply reel 27 and continuously advanced through the forming die of its respective extruder.

A method of and apparatus for handling the compound strip 11 between the extruder 10 and the extruders 23 and 25 is disclosed more fully and claimed in a co-pending application Serial No. 103,434, filed August 7, 1949, by R. R. Barber, G. E. Henning and B. A. Raetsch, for "Methods of and Systems for Processing Vulcanizable Compounds."

The extruder 10, which converts the mixed compound into a continuous strip, is capable of supplying the compound strip at a rate sufficient to maintain the extruders 23 and 25 in continuous operation. The takeup apparatus 19 is designed to take up the compound strip 11 on any one of the reels 20—20 that is empty, and to permit the strip previously taken up to be withdrawn from another one of the reels by the conveyor 23 or the conveyor 25. The temporary strip apparatus 18 is provided between the cooler 12 and the strip takeup apparatus 19 for the purpose of taking up the compound strip 11 during the time that the compound strip is severed from a full reel and is connected to an empty reel of the strip takeup apparatus 19. When the switchover from a full reel to an empty reel is completed, the particular takeup reel to which the end of the strip is attached is rotated to reel the compound strip at such a rate that it will take up the compound strip stored in the storage apparatus 18, after which the reel rotates at a slower speed to take up the strip 11 at the rate that it is delivered from the extruder 10.

The extruder 10, the cooler 12, the temporary strip storage apparatus 18, the conveyors 22 and 24 and the extruders 23 and 25 do not form a part of the present invention, hence, no detailed description thereof is required.

The strip takeup apparatus 19 (Figs. 2 and 3) consists of a circular base 30 having a central portion thereof formed concavely so that only a portion of the periphery of the base rests on the floor where the strip takeup apparatus 19 is to be used. The base 30 has a central hub 31 rigidly secured thereto, which is provided with an internal bore to receive the end of a tubular support 32. The lower end of the support is secured to the hub 31 in a suitable manner and the upper end thereof is provided with a plug 35 having an upwardly extending portion to which a frame 36 is secured by means of screws 37—37. The frame 36 is substantially L-shaped, and has the longer leg thereof secured to the base 30 by a plurality of screws one of which is shown and indicated by the numeral 38.

A shaft 21 (Fig. 3) is an elongated tube which is positioned over the support 32, and has an annular member 41 rigidly secured to the lower end thereof so as to support the lower end of the shaft 40 by means of a bearing 42 mounted on the hub 32. The upper end of the tubular shaft has an annular cap 46 (Fig. 2) secured thereto by bolts 47—47, the cap being designed to engage an anti-friction bearing 50 positioned in a counterbore provided in the upper end of the post 32. The anti-friction bearings 42 and 50 serve to maintain the shaft 21 freely rotatable about the post 32. A sprocket 52 (Fig. 2) is rigidly secured to the annular member 41 and engages an endless chain 53 driven by a sprocket 54 provided on a gear reducer 55. The input shaft 56 of the gear reducer 55 is provided with a pulley 58, which is connected to a variable pitch pulley 60 provided on the armature shaft of a motor 61 by a belt 62. During the normal operation of the strip-handling apparatus 19, the motor 61 is energized continuously and rotates the shaft 21 at a predetermined rate of speed determined by the pitch of the pulley 60 and the fixed ratio of the gear reducer 55.

The strip takeup and storage apparatus is fully described and claimed in a copending application Serial No. 103,433, filed August 7, 1949, by Messrs. R. R. Barber, P. R. Powell and B. A. Raetsch for "Strip-handling Apparatus."

The reels 20—20 are arranged to be selectively driven by or disengaged from the shaft 21 by clutches 63—63 to which this invention is particularly directed. Since the clutch 63 for each reel is identical in construction and operation, only one clutch 63 as shown in section in Fig. 3 will be described in detail.

This clutch 63 consists generally of a reel 20 together with a clutch plate 65 slidably positioned on the shaft 21 adjacent to the reel, an actuator 66 positioned adjacent to the clutch plate 65 and a stationary support 67 positioned beneath the actuator 66. The actuator 66 is positioned slidably on a sleeve 71 positioned slidably on the shaft 21. The support 67 is positioned rotatably on a bushing 72, positioned slidably on the shaft 21. A grease retaining cup 73 is positioned between the bushing 72 and the hub 41 of the shaft 21 to retain the lubricant applied between the support 67 and the bushing 72. A spacer 75 is positioned slidably on the shaft 21 so that the lower end thereof engages the top surface of the clutch plate 65 and the upper end thereof engages the bottom of another bushing like the bushing 72 positioned on the shaft to support an annular member like the member 67 forming part of the clutch for the next reel.

A clutch plate 65, a sleeve 71 and a bushing 72 are positioned in tandem on the shaft 21 in the manner shown in Figs. 2 and 3 for each reel of the takeup apparatus 19 and each group is spaced a predetermined distance apart by spacers 75—75. A spacer 76 is positioned on the shaft 21 so that the end thereof engages the top surface of the uppermost clutch plate 65 while the upper end thereof engages an annular shoulder provided on the cap 46 secured to the shaft 21. When the cap 46 is clamped securely in place by the bolts 47—47, it presses downwardly so as to lock the spacers 75—75, the clutch plates 65—65, the sleeves 71—71 and the bushings 72—72 tightly together between the hub 41 and the cap 46. By virtue of this arrangement, all the spacers clutch plates, sleeves and bushings are locked for rotation with the shaft 21. As the result, when the shaft is rotated, the clutch plates 65—65 are rotting beneath their respective reels 20—20.

Each of the reels has a circular head 77 provided with a central hub 80 having a bore which permits the reel to be positioned rotatably and slidably on the spacers 75—75. The reel 20 also is provided with a winding drum 81 secured rigidly to the head 77 for coiling the compound strip 11 therearound as it emerges from the extruder 10. Since the reel 20 is rotatable about the spacer 75, the weight of the reel causes the head 77 to rest on driving segments 82—82 made of suitable friction material and attached to the top surface of the clutch plate 65 when the actuator 66 is in the position shown in Figs. 2 and 3.

The actuator 66 is provided with three rollers 84—84 spaced equally around the periphery thereof. The actuator 66 is positioned slidably on the sleeve 71, and is carried by the support 67 by thre dumbbell-shaped pins 85—85 seated in recesses spaced equally about the actuator 66 and recesses 87—87 spaced equally about the support 67. When the recesses 86—86 and 87—87 of the actuator 66 and the support 67, respectively, are aligned longitudinally, the dumbbell-shaped pins 85—85 are positioned perpendicularly between the support 67 and the actuator 66 (Fig. 11).

The pins 85—85 (Figs. 10 and 11) have their opposite ends curved at 88—88 to such an extent that a line drawn through the points of tangency with the bottom of their respective recesses 86 and 87 when the pins are positioned vertically as seen in Fig. 11, is shorter than a line drawn through the points of tangency with the same recesses when the pins are positioned obliquely as seen in Fig. 10. Therefore, when the pins are positioned vertically, the rollers 84—84 of the actuator 66 do not engage the head 77 of the adjacent reel 20, in which case, the reel rests on the friction segments 82—82 of the adjacent clutch plate 65 and is rotated therewith. When the pins are positioned obliquely as seen in Fig. 10, the support 66 is moved longitudinally of its axis so that the rollers thereof engage the head of the adjacent reel and lift it off the clutch plate, in which case, the reel is freely rotatable on the rollers about the shaft 21.

These results are obtained because the radius of the curved surface on the ends 88—88 of the pins is greater than one-half the vertical length of the pins. It is to be understood however, that the curved surfaces 88—88 could be produced by a radius which is less than one-half the vertical length of the pins. This construction of the surfaces 88—88 would produce the opposite effect on the support 66 because the length of the pins between the points of tangency when they are positioned vertically is greater than when they are positioned obliquely.

A bar 90 has one end thereof clamped to the annular member 67 and the other end thereof secured to the frame 36, in order to prevent rotation of the annular member 67 when the bushing 72 and the shaft 21 are rotated by the motor 61. A support 91 has one end thereof secured to the support 67 and the fre end thereof turned upwardly at 92 so that it is substantially perpendicular to the head 77 of the adjacent reel. The upturned end 92 of the support 91 is provided with notches 93 and 94, which are designed to be engaged by a lever 96 having the inner end thereof attached to the actuator 66 (Fig. 9).

Figure 4:
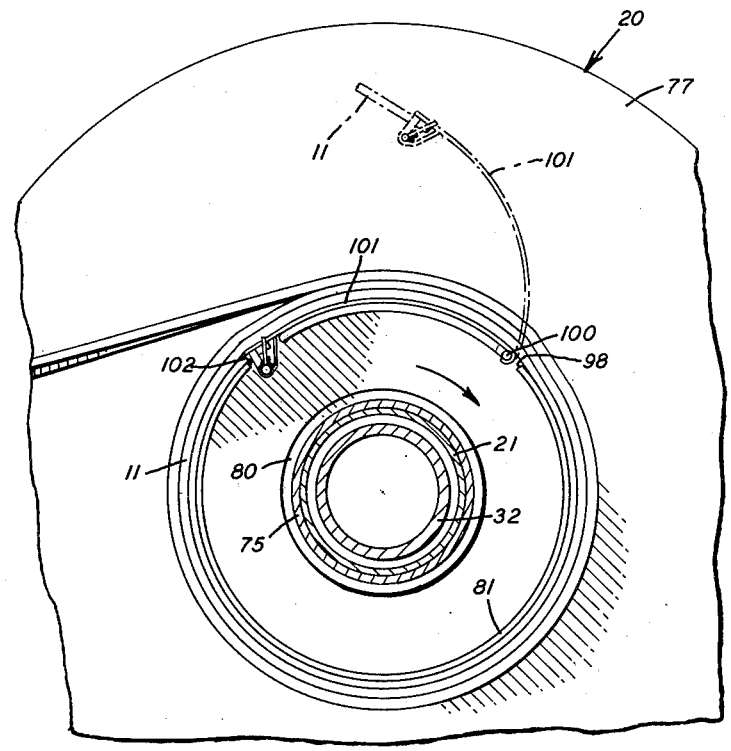
Fig. 4 is a horizontal section taken along line 4—4 of Fig. 2.
Figures 5, 6:
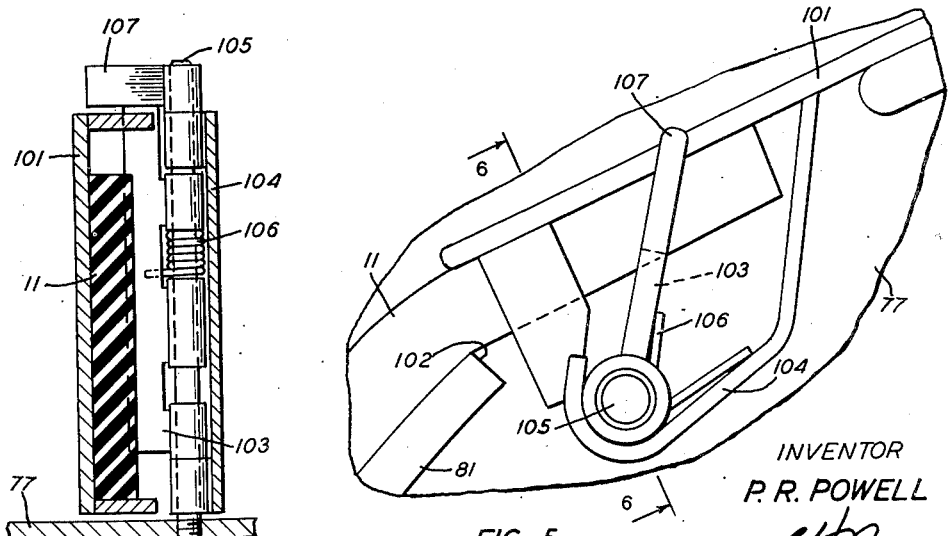
Fig. 5 is an enlarged, fragmentary view of a portion of the apparatus shown in Fig. 4.
Fig. 6 is a vertical section taken along line 6—6 of Fig. 5.

Referring to Fig. 4, it is noted that the winding drum 81 of each reel is provided with an opening 98 in which is positioned a post 100. An arcuate member 101 has one end thereof hingedly mounted on the post 100 so that the free end thereof may be moved outwardly away from the drum 81 to a position adjacent to the periphery of the head 77. The drum 81 also is provided with an opening 102, to receive a strip clamp mechanism mounted on the free end of the arcuate segment 101. The strip clamp consists of a bar 103 hingedly mounted on a support 104 secured to the free end of the segment 101 by means of a pin 105 (Figs. 5 and 6). A spring 106 is positioned over the pin 105 in the hinged connection between the bar 103 and the support 104 so as to continuously urge the bar 103 in a counterclockwise direction as seen in Fig. 5, so that the free end thereof normally rests against the end of the arcuate member 101. When the end of the compound strip 11 is inserted in the support 104, it moves the bar 103 away from the arcuate member 101, in which case, the bar 103 grips under the compound end of the strip 11 and clamps it tightly against the end of the segment 101. A lever 107 is secured on the upper end of the bar so that the bar 103 may be turned in a clockwise direction against the action of the spring 106 to release the end of the strip 11 from the end of the arcuate member 101 when desired.

*Operation*

Let it be assumed that the extruder 10 is converting a batch of mixed extrudable compound into the strip 11 at a predetermined rate, and that the reels 20—20 of the takeup apparatus 19 are empty. Let it be assumed further that the motor 61 is connected across a suitable source of potential, and is energized to rotate the shaft 21 and each of the spacers 75—75, the clutch plates 65—65, the sleeves 71—71 and the bushings 72—72, which are locked for rotation with the shaft 40 by the cap 47. Each of the levers 96—96 is positioned in the notch 93 of its respective support 91 in which position the lever holds the actuator 66 in such a position that the recesses 86—86 provided in the actuator are misaligned with respect to the recesses 87—87 provided in the support 67. This position of the actuator 66 tilts its respective pins 85—85 out of their vertical position so that they are positioned obliquely between the actuator and the support as seen in Fig. 11. When the pins are positioned obliquely as described, they slide the actuator 66 upwardly on the sleeve 71 so that the rollers 84—84 provided on the actuator engage the head 77 of the reel 20 and disengage it from the driving segments 82—82 positioned on its respective clutch plate 65.

When each of the reels is positioned on the rollers of their respective ring, none of the reels is rotated about the central support 32. With the takeup apparatus 19 so adjusted, the leading end of the compound strip 11 is attached to the winding drum 81 of the uppermost reel 23. To attach the end of the strip to the winding drum, the arcuate member 101 of the drum is moved outwardly to its broken line position shown in Fig. 4, and the end of the strip is inserted between the spring-preessed bar 103 and the end of the arcuate member.

After the end of the strip is clamped to the end of the arcuate member, the uppermost lever 96 is disengaged from the notch 93 and is positioned in the notch 94 of its respective support 91. This movement of the lever 96 turns the actuator 66 in a counterclockwise direction as viewed in Fig. 4 and vertically aligns the recesses 86—86 provided in the actuator 66 with the recesses 87—87 provided in the support 67. This arrangement of the recesses 86—86 and 87—87 moves the pins 85—85 from their oblique position to a vertical position and thereby allows the actuator 66 to slide downwardly on the sleeve 71. This downward movement of the actuator is sufficient to disengage the rollers 84—84 from the head 77 of the uppermost reel 20 and allows the reel to move downwardly until the head rests against the driving segments 82—82 provided on the adjacent clutch plate 65. Since the clutch plate 65 is rotating continuously with the shaft 21, it rotates the reel 20 by virtue of the engagement of the head 77 with the segments 82—82.

The clutch plate 65 rotates the reel 20 in a clockwise direction as viewed in Fig. 4, and creates a pull on the strip 11, which causes the arcuate member 101 to move inwardly and lay against the portion of the drum 81 positioned between the openings 93 and 102. The reel 20 continues to rotate in this direction and coil up the strip 11 until the reel is full, at which time the uppermost lever 96 is returned to the notch 93 so as to tilt the pins 86—86 and raise the actuator upwardly so that the rollers 84—84 thereof engage the head 77 and lift the reel off the clutch plate 65. The compound strip 11 is severed, and the leading end thereof is secured to the arcuate member 101 of the winding drum 81 of the next lower or second reel 20. The lever 96, associated with the latter reel, is actuated to move its respective pins 86—86 to their vertical position, as shown in Fig. 10, and thereby lowers the second reel so that it is rotated by its respective clutch plate 65. After the second reel starts to coil up the strip 11, the compound strip coiled on the top reel 20 is withdrawn therefrom by the conveyor 22 and fed to the extruder 23, whereby the extruder 23 is placed in operation to work the compound into an extrudable state and extrude it on the core in accordance with well-known extruding practices.

It should be noted that the uppermost reel 20 is resting on the rollers 84—84 and thereby is rotatable freely about the shaft 21 and that the withdrawal of the strip 11 rotates the uppermost reel 20 in a direction opposite to that in which the shaft 21 is rotated by the motor 61. As soon as the second reel is full, its associated lever 96 is positioned in its notch 93 to terminate the rotation of the second reel in the manner described, and the compound strip is severed so that the leading end thereof may be connected to the winding drum 81 of the third reel.

Since the extruder 18 is designed to form the strip 11 at a rate which is at least twice the rate at which the strip 11 is consumed by the extruder 23, the next lower reel will fill before one-half of the length of the strip coiled on the first reel is withdrawn therefrom because the extruder 23 started to use the strip after the second reel head started to coil up the strip. Therefore, since the second reel contains its maximum quantity of the strip 11 before the strip is completely withdrawn from the first reel at least a reel full of the strip 11 is stored on the strip takeup apparatus 19 by the time the first reel is exhausted. As the result, a continuous supply of the strip 11 is provided for the extruder 23, because as soon as the first reel is exhausted, the outer end of the compound strip wound on the second reel is withdrawn therefrom and inserted in the conveyor 22 which conveys the strip to the extruder 23.

While the compound strip is being withdrawn from the first reel by the conveyor 22, the third lever 96 is positioned on its respective notch 94, whereupon the third reel is rotated and coils up the strip.

When the third reel is filled with the strip 11, the strip is severed and the leading end thereof is connected to the hinged member of the winding drum 81 of the fourth reel 20. The fourth reel 20 is positioned in the notch 94 of its respective support to cause the reel to be driven by its clutch plate and coil up the strip 11. The end of the strip on the third reel is placed on the conveyor 24 which withdraws the strip from the third reel and conveys it to the extruder 25. The extruder 25 works the compound strip into a plastic state and extrudes it on a core 26 being advanced therethrough in the form of an insulating covering or jacket.

Shortly after the fourth reel starts to coil up the strip 11, the extruder 23 consumes the length of the strip coiled up on the first reel, in which case, the strip on the second reel is fed to the extruder 23 by the conveyor 22. The fourth reel fills up before the extruder 25 uses one-half the strip coiled on the third reel because the extruder 18 is forming the strip twice as fast as it is used by the extruder 25. This arrangement provides a continuous supply of the compound strip to the extruder 25 because as soon as the extruder 25 uses the strip on the third reel it is supplied with the strip stored on the fourth reel.

As soon as the fourth reel takes up its maximum length of the compound strip, the reel is disconnected from its clutch plate in the manner described, the strip is severed, and the leading end is connected to the winding drum of the first reel. The first reel then is engaged by its clutch plate to coil up a length of the strip to be used by the extruder 23 after it has used the strip on the second reel. This same procedure is followed as each reel becomes exhausted so as to maintain a supply of the compound strip which will keep the extruders 23 and 25 in continuous operation for sustained periods of time.

It should be noted that the clutch plate 65 for each reel is so designed that the driving segments 82—82 thereof engage the head of the reel to be driven thereby at a predetermined distance of the central axis of the post 32. This spacing of the friction segments 82—82 on the clutch plates causes them to drive their respective reels 20—20 with a force sufficient to coil up the compound strip and create a predetermined tension on the strip at the beginning of the coiling operation. As the amount of compound strip taken up by the reel increases the weight carried by the reel is increased and as a result the reel bears more heavily against the driving segments 82—82 of its respective clutch plate 65. Therefore, as the winding diameter of the reel increases, the torque exerted on the reel increases a corresponding amount to maintain a substantially uniform tension on the compound strip.

As the winding diameter of the reel increases due to the build up of the layers of compound strip on the winding drum 81, the speed of rotation of the reel 20 must decrease constantly since the strip is being supplied to the reel at a uniform rate. This results because, as the winding diameter of the reel builds up, the reel slips with respect to the clutch plate 65 and thereby maintains a uniform tension on the strip as it is coiled up as it continuously adjusts its speed in accordance with the change in the winding diameter of the reel.

While the above-described clutch is particularly well adapted for use with strip takeup and storage apparatus of the type described, it may be readily adapted to various types of apparatus including a driven member to be selectively free of or driven by a driven member without departing from the spirit and scope of the invention.

What is claimed is:

1. A clutch for selectively engaging and disengaging a freely rotatable reel to and from a rotating vertically positioned shaft upon which the reel is mounted loosely, which comprises an annular drive plate fixedly mounted on the shaft for rotation therewith, friction means provided on the upper surface of the annular drive plate and normally contacting the lower surface of the reel whereby said reel is rotated with a torque directly proportional to the weight of the reel and any material wound thereon, an annular support mounted loosely on the shaft but incapable of vertical movement with respect thereto, a spider mounted loosely on the shaft between the drive plate and the support and slidable vertically on the shaft, supporting rollers provided on the spider, a plurality of dumbbell-shaped pins positioned end-wise between the spider and the support for spacedly supporting the spider from said support, said pins having end surfaces of such configuration that when they are in a vertical position the spacing between the spider and the support is a minimum and the supporting rollers on the spider are out of contact with the lower surface of the reel and when they are tilted the spacing is increased so that the rollers on the spider rotatably support the reel out of contact with the friction means of the drive plate, and means for selectively positioning the spider so as to hold the pins in a vertical position or to hold the pins in a tilted position.

2. A clutch for selectively engaging and disengaging a freely rotatable reel to and from a rotating vertically positioned shaft upon which the reel is mounted loosely, which comprises an annular drive plate fixedly mounted on the shaft for rotating therewith, friction means provided on the upper surface of the annular drive plate and normally contacting the lower surface of the reel whereby said reel is rotated with a torque directly proportional to the weight of the reel and any material wound thereon, an annular support mounted loosely on the shaft but incapable of vertical movement with respect thereto, a spider mounted loosely on the shaft between the drive plate and the support and slidable vertically on the shaft, supporting rollers provided on the spider, a plurality of dumbbell-shaped pins positioned between the spider and the support and mounted in complementary sockets formed in the opposing surfaces of the spider and the support, each of said pins comprising a cylindrical central portion and frustroconical outer portions having spherically curved end surfaces, the radius of curvature of each of said end surfaces being greater than one-half the length of its associated pin measured along the longitudinal axis thereof, and means for selectively positioning the spider with respect to the support to hold the pins in a position parallel to the vertical axis of the shaft so that the support rollers on the spider are retracted out of contact with the lower surface of the reel or to tilt the pins with respect to the vertical axis of the shaft so that the support rollers rotatably support the reel out of contact with the friction means on the drive plate.

PAUL R. POWELL.

REFERENCES CITED

The following references are of record in the file of this patent:

UNITED STATES PATENTS

| Number | Name | Date |
|---|---|---|
| 274,953 | Lyman | Apr. 3, 1883 |
| 693,318 | Bardsley | Feb. 11, 1902 |
| 787,072 | Brush | Apr. 11, 1905 |
| 1,041,010 | Brownell | Oct. 15, 1912 |
| 1,629,763 | Woodrow | May 24, 1927 |
| 1,981,501 | Geldhof | Nov. 20, 1934 |
| 2,111,143 | Geldhof | Mar. 15, 1938 |
| 2,343,961 | Del Valle | Mar. 14, 1944 |
| 2,424,739 | Canady | July 29, 1947 |
| 2,436,717 | Foster | Feb. 24, 1948 |